Oct. 19, 1965  G. W. SMITH  3,212,336

TEMPERATURE MEASURING DEVICE

Filed June 1, 1961

INVENTOR.
BY George W. Smith

Paul J. Ethington
ATTORNEY

United States Patent Office 3,212,336
Patented Oct. 19, 1965

3,212,336
TEMPERATURE MEASURING DEVICE
George W. Smith, Birmingham, Mich., assignor to General Motors Corporation, Detroit, Mich., a corporation of Delaware
Filed June 1, 1961, Ser. No. 114,229
1 Claim. (Cl. 73—362)

This invention relates to a device for measuring temperatures, and more particularly, to devices for measuring high temperatures.

Frequently it is desirable to measure high temperatures such as those generated by jet engines. In such cases it is necessary to utilize a measuring device which is accurate and which has a rapid response to temperature changes.

The purpose of this invention is to provide such a temperature measuring device, and the invention is carried out by heating an electrode to the temperature to be measured and measuring the amount of thermionic emission from the electrode.

Figure 1:
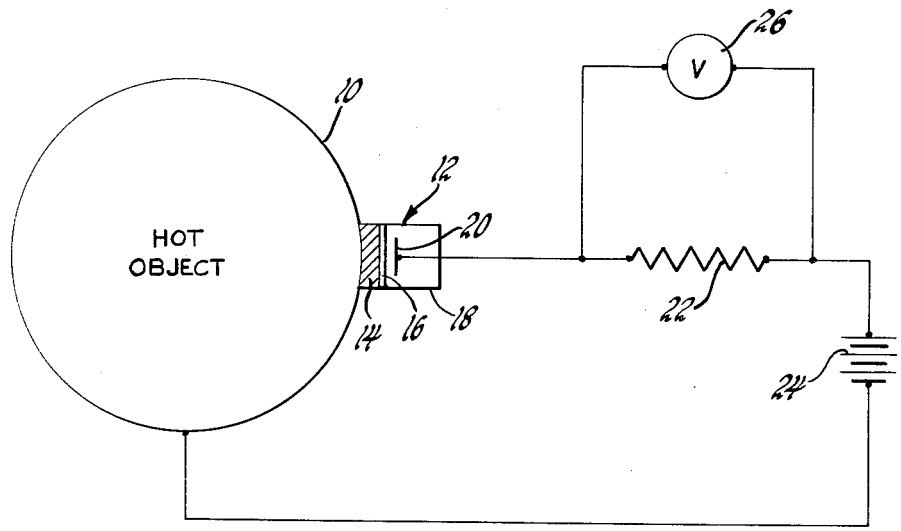
Figure 2:
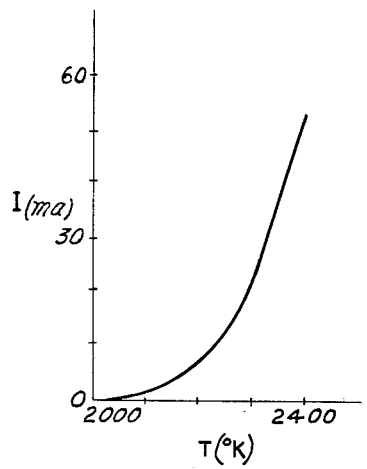

The invention will be made more apparent from the following specification taken in conjunction with the accompanying drawings wherein:

FIGURE 1 is a schematic diagram of a temperature measuring device according to the invention; and FIGURE 2 is a graph of the relationship of thermionic emission current to temperature.

FIGURE 1 illustrates a heat source 10 such as a jet engine or other hot object whose temperature is to be measured and a vacuum diode 12 in thermal and electrical contact therewith. The diode 12 comprises a metal base 14 supporting a cathode 16 in good thermal contact therewith. The base 14 also supports an envelope 18 which in turn carries an anode 20 spaced from the cathode 16. Of course, if desired the anode 20 may be supported by any suitable structure mounted on the base 14. Since the base is metallic it provides a good electrical path as well as a good thermal path between the hot object 10 and the cathode 16.

The diode 12 is connected to an electrical circuit which comprises a resistance 22 and a voltage source 24 in series with the anode 20 and the cathode 16 thereby comprising an electrical circuit including the heat source 10. However, this circuit is practical only when the heat source 10 is a good electrical conductor. Accordingly, for those cases where the heat source is not a conductor, the electrical circuit may be connected directly to the metallic base 14 of the vacuum tube 12.

When the cathode 16 is heated to the temperature of the heat source 10, electrons are given off by thermionic emission, the number of which depends upon the temperature. If a positive voltage is applied to the anode 20 by the voltage source 24, the electrons will be attracted thereto and cause a current to flow through the circuit. This current can be measured by measuring the voltage drop across the resistor 22 by a voltmeter 26. Of course, the meter 26 may be calibrated in terms of temperature to provide a direct reading.

Emission current, and hence the voltage drop, is a function of the temperature of the cathode. According to the well-known Dushman equation, the thermionic emission current will be $I = A_0 S T^2 e^{-b_0/T}$ where, for a tungsten cathode, $A_0 = 60.2 \times 10^4$ amp/(m.$^2$)($^\circ$K.$^2$), S is the area of the emitting surface, and $b_0 = 52,400^\circ$. The graph of FIGURE 2 depicts this equation for a typical vacuum tube and shows that in the operation range (over 10 ma.) a small change of temperature effects a relatively large change of current, thereby permitting accurate temperature measurements. In addition, for larger currents (over 20 ma.) the curve is nearly linear, thereby simplifying calibration of the readout instrument 26. By proper choice of cathode materials, a temperature range from about 1000° K. to more than 2400° K. can be measured. For example, alkaline earth metals are suitable cathode materials for the lower temperature range, and tungsten is suitable for the higher temperature range. By selecting high thermal conducting materials for the base and by utilizing miniaturized parts, a fast response time of the order of one second is readily obtainable.

Hence it is seen that the invention provides a very simple and compact device for measuring high temperatures. Since the current flowing through the circuit is limited by the thermionic emission of the cathode 16, the amount of current flow is relatively independent of the magnitude of the applied voltage so long as the voltage is sufficiently high to operate the diode in the emission limited range. Hence the current is insensitive to minor voltage fluctuations and a very accurate voltage source is not required.

The above described embodiment of the invention is intended only as a specific illustration of the invention and is not to be taken as limiting the scope of the invention which is defined by the following claim:

I claim:

A device for measuring the temperature of a hot object comprising a vacuum tube having an anode, a cathode, and a thermally and electrically conductive metallic base intimately connected to the cathode for establishing good heat conductivity between said cathode and said object thereby heating the cathode to the temperature of the object, means for applying a potential across said tube and means for measuring the current produced thereby.

References Cited by the Examiner

UNITED STATES PATENTS

| 1,860,187 | 5/32 | Koller | 73—362 X |
| 2,610,677 | 9/52 | Lange | 158—28 |

FOREIGN PATENTS 922,256  7/49  Germany.

ISAAC LISANN, *Primary Examiner.*